United States Patent [19]

Ball et al.

[11] Patent Number: 4,802,900
[45] Date of Patent: Feb. 7, 1989

[54] LABORATORY ANIMAL CARRIER FILTER BAG

[76] Inventors: Keith R. Ball, 16 Winans Pl., Piscataway, N.J. 08854; David M. Thompson, 423 Cross Rd., Matawan, N.J. 07747

[21] Appl. No.: 25,255

[22] Filed: Mar. 12, 1987

[51] Int. Cl.[4] .............................................. B01D 39/16
[52] U.S. Cl. ................... 55/381; 55/DIG. 5; 55/DIG. 12; 55/385.1
[58] Field of Search ............ 55/361, 381, 385 R, 55/515, 516, DIG. 5, DIG. 12; 426/394

[56] References Cited

U.S. PATENT DOCUMENTS

| | | | |
|---|---|---|---|
| 1,190,221 | 7/1916 | Daugherty | 55/381 X |
| 2,154,638 | 4/1939 | Reeves | 55/361 X |
| 2,490,057 | 12/1949 | Irmscher | 426/394 X |
| 2,787,548 | 4/1957 | Dannenhoffer et al. | 426/394 X |
| 3,105,617 | 10/1963 | Felldin | 55/361 X |
| 3,203,551 | 8/1965 | Loan, Jr. | 55/381 X |
| 3,243,099 | 3/1966 | Winegard | 55/361 X |
| 3,907,530 | 9/1975 | Fesco | 55/381 X |
| 3,990,872 | 11/1976 | Cullen | 55/515 X |
| 4,415,597 | 11/1983 | Romagnoli | 426/394 |
| 4,666,479 | 5/1987 | Shoji | 55/385 R |

*Primary Examiner*—Robert H. Spitzer
*Attorney, Agent, or Firm*—Rohm & Monsanto

[57] ABSTRACT

A filter bag enclosure for containing a laboratory animal and a carrier therefor during transportation is provided with lateral and top seals which prevent gaseous communication with the laboratory animal therewithin except through the filter medium which forms the lateral sides of the filter bag. In accordance with the invention, the lateral edges of the filter bag are sealingly joined to one another by the application of acoustic energy. A length of sealing material, which may be polyethylene, is advantageously interposed between the edges prior to the application of the acoustic energy so as to enhance the reliability of the lateral seals. The top portion of the filter bag is provided with polyethylene strips joined thereto, illustratively by the use of ultrasonic acoustic energy. After the laboratory animal and its carrier is installed inside of the filter bag, the filter bag may be closed by conventional heat sealing of the polyethylene top strips.

6 Claims, 1 Drawing Sheet

LABORATORY ANIMAL CARRIER FILTER BAG

BACKGROUND OF THE INVENTION

This invention relates generally to animal carrier systems, and more particularly, to a filter bag for enclosing a laboratory animal in a carrier during transportation, the filter bag being sealable so as to prevent any bypass of the filter medium.

Specially produced laboratory animals, particularly animals which are marketed to be used in laboratory research, are transported throughout the world. However, it is a significant problem in this industry that, particularly during transportation, the laboratory animals will be subjected to environments which may contain contaminants. Clearly, such contaminated laboratory animals may cause erroneous experimental results during the research, and may also contaminate other laboratory animals. It is therefore essential that laboratory animals be transported in clean environments, and the air which such animals breath must be filtered to exclude the contaminants.

In addition to the foregoing, it is important for a recipient of such a laboratory animal to know whether, during transportation, the animal has been exposed to the environment outside of the transportation container. As is well known, such exposure of the laboratory animal to unknown contaminants will render the animal useless for certain controlled research projects and experiments, particularly where the entire history of the animal must be known.

It is, therefore, an object of this invention to provide a simple and economical system for transporting laboratory animals.

It is a further object of this invention to provide a reliable filter bag system for ensuring that the animal transported therein is not contaminated by direct exposure to the environment, while permitting a sufficient flow of filtered air through the filter bag system to prevent suffocation of the animal.

It is another object of this invention to provide a simple and economical system for sealing the filter bag, whereby any opening of the filter bag which would expose the laboratory animal therein to the environment can easily be detected.

It is an additional object of this invention to provide a filter bag system which can be sealed easily and rapidly without requiring adhesives which might cause contamination of the laboratory animal.

SUMMARY OF THE INVENTION

The foregoing and other objects are achieved by this invention which provides in a first aspect thereof, a filter bag construction for a laboratory animal carrier, the filter bag being formed of a sheet of a first polymeric material which has been folded onto itself at least once to form first and second lateral sides each having first and second side edges and a top edge. The first edges of the lateral sides are joined together, as are the second edges of the lateral sides, with first and second lateral seals. In accordance with the invention, a top seal is formed of a second polymeric material which is joined along at least one top edge of the first and second lateral sides.

In a highly advantageous embodiment of the invention, the first polymeric material is a spun-bonded polyester sheet, such as that which is marketed under the trade name REMAY by DuPont. This polymeric material affords the advantages of high tensile strength, to protect the laboratory animal therewithin, while also serving as a filtration medium having a filtration characteristic sufficient to exclude airborne contaminants from the interior of the container, while permitting sufficient air to flow into the container to sustain the life of the animal.

The first and second side edges, respectively, of the first and second lateral sides are sealingly joined to one another to form first and second lateral seals. In one embodiment, an acoustic energy is applied to the side edges so as to produce the required joining therealong. Although the edges of spun-bonded polyester sheets can be joined to one another by use of the acoustic energy, some embodiments of the invention utilize a further polymeric material in the form of a sheet, which may be a polyethylene sheet, interposed between the sheets prior to the application of the acoustic energy. This use of polyethylene improves the strength and reliability of the lateral seals.

The polymeric material which is used for the top seal may also be a polyethylene sheet. In some embodiments, the polyethylene sheet which forms the top seal is bonded by the application of ultrasonic energy to the top edge of at least one of the lateral sides. However, in a preferred embodiment, lengths of such polyethylene material may be joined to both top edges so as to extend outward from the filter bag. The polyethylene sheet, in a practical embodiment of the invention, may have a thickness of 0.007 inches. When it is desied to seal the filter bag, the protruding lengths of polyethylene sheet can be joined sealingly to one another throughout their lengths by application of heat. Thus, all that is required to seal the filter bag is conventional heat sealing apparatus such as that which utilizes an electrically heated teflon coated metal bar which operates against a teflon coated wire anvil.

In some embodiments of the invention, the bottom portion of the filter bag is provided with a plurality of folds so as to produce an expandable, accordion-like structure. Such expandability facilitates accommodation of a carrier for a laboratory animal, such as a laboratory mouse, within the filter bag.

In accordance with a method aspect of the invention, a length of filter sheet material is bent to produce first and second sides, and a bottom portion in the vicinity of said bend. Each of the first and second sides have respective first and second lateral sides extending from the bottom portion to a respective top edge. The method further includes the step of sealing the first lateral edges to one another, and the second lateral edges to one another, and joining sealingly the top edges of the first and second sides to a sheet of sealing material.

In embodiments of the invention where the sealing material is sheet polyethylene, a sealing closure of the bag container is effected by applying heat to the polyethylene sealing material; the first and second lateral sides being sealed by application of acoustic energy thereto.

In certain embodiments of the method aspect of the invention, the step of interposing polyethylene sealing material between the first lateral edges and the second lateral edges is performed prior to performing the step of applying acoustic energy. Such use of polyethylene as a sealing material enhances the reliability of the lateral seals.

BRIEF DESCRIPTION OF THE DRAWING

Comprehension of the invention is facilitated by reading the following detailed description in conjunction with the annexed drawing, in which.

Detailed Description

Figure 1:
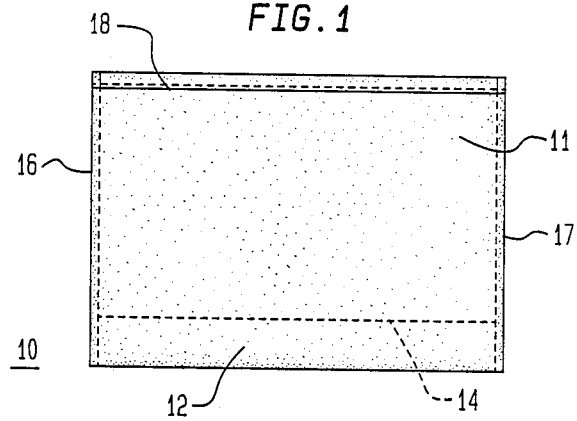
FIG. 1 is a plan view of a filter bag constructed in accordance with the invention.

FIG. 1 is a plan view of a filter bag 10 constructed in accordance with the invention. The filter bag is formed of a continuous sheet 11 of a filter material, which may be a spun-bonded polyester such as that marketed under the trade name REMAY by DuPont. In this specific embodiment, the sheet of filter material is folded at its bottom portion 12 to form an accordion fold, as represented by dashed line 14.

Filter bag 10 is shown to have first and second lateral edges 16 and 17, respectively. In addition, the filter bag has a first top edge 18, and a second top edge which is not shown in this figure. In this embodiment, lateral edges 16 and 17 are sealed using ultrasonic energy. The first top edge is provided with a polyethylene seal 20 which will be described hereinbelow with respect to FIG. 2.

Figure 2:
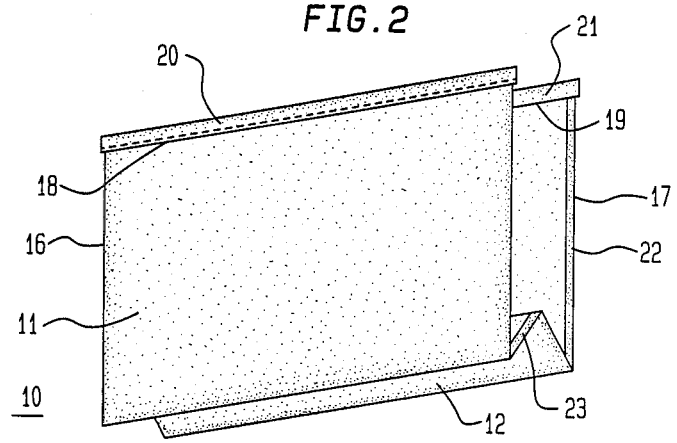
FIG. 2 is an isometrical representation of a side view of the filter bag of the invention prior to effecting a lateral seal.

FIG. 2 is an isometrical representation of filter bag 10 prior to the sealing of lateral edge 17. This figure shows first top edge 18 with its polyethylene seal 20, and also a second top edge 19 with a further polyethylene seal 21.

In this specific embodiment, the interior of lateral edge 17 is provided with a sealing material 22, which may be formed of a strip of polyethylene. As shown, sealing material is also applied in region 23 of the accordion fold of bottom portion 12. In this manner, sealing material 22 is interposed between all two-sided communication of filter material 11. Upon the application of acoustic energy to lateral edge 17 to effect a seal, the sealing material enhances the reliability thereof. Although it is understood that the use of a sealing material 22 is optional, a similar construction may be used in effecting a seal along lateral edge 16.

After completing the sealing of lateral edges 16 and 17, access to the interior of the filter bag is achieved through the top of the bag. However, once an animal carrier (not shown) and a laboratory animal (not shown) is inserted into the filter bag, it is desired to effect a seal along the top edges. In accordance with this invention, this is achieved by the application of heat using a conventional heat bar system (not shown) to polyethylene seals 20 and 21. This results in a completely closed filter bag which permits gaseous communication with the laboratory animal therewithin only through the filter medium of filter material 11.

Figure 3:
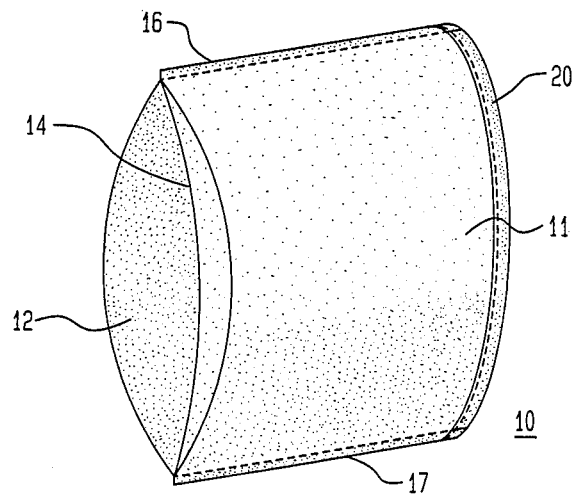
FIG. 3 is an isometrical representation showing a bottom view of the filter bag of the present invention.

FIG. 3 is a schematic representation of filter bag 10 showing the underside of bottom portion 12. As shown, the accordion fold, which includes fold line 14, permits the filter bag to be expandable and therefore accommodate comfortably the carrier and laboratory animal. However, the practice of the invention does not require such an accordion fold.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention and should not be construed to limit the scope thereof.

What is claimed is:

1. A container comprising:

a continuous length of spun polyester sheet which is folded so as to form first and second side portions and a bottom portion continuously with, and intermediate of, said first and second side portions, said bottom portion being folded onto itself so as to be expandable, said first and second side portions each having lateral edges and a top edge, and being joined at respective ones of said lateral edges to one another;

polyethylene seal means installed intermediate of said folds in said folded bottom portion, said folded bottom portion being sealed continuously on respective sides thereof with said first and second side portions; and a polyethylene seal for closing an opening defined by said top edges of said first and second sides, said opening being distal from said bottom portion.

2. A method of constructing a bag container, the method comprising the steps of:

folding a length of filter sheet a plurality of times to produce first and second sides, and a bottom portion intermediate of said first and second sides, each of said first and second sides having respective first and second lateral edges extending from said bottom portion to a respective top edge, said top edges being distal from one another along said length of filter sheet;

interposing a polyethylene sealing material between said first lateral edges, between said second lateral edges, and between respective edge portions of said bottom portion, said edge portions of said bottom portion being interposed between said lateral edges of said first and second sides;

applying a sealing energy for melting at least partially said polyethylene sealing material and thereby sealing said first lateral edges to one another and said second lateral edges to one another to form seals extending continuously for the lengths of said first and second sides, a portion of each of said lengths of said seals including said respective edge portions of said bottom portion interposed between said lateral edges of said first and second sides; and joining sealingly said top edges of said first and second sides to a further sealing material.

3. The method of claim 2 wherein said sealing material is polyethylene.

4. The method of claim 3 wherein there is provided the further step of applying heat to said polyethylene sealing material to effect a sealing of the bag container.

5. The method of claim 2 wherein said step of sealing is performed by applying acoustic energy to said lateral edges.

6. The method of claim 2 wherein said filter sheet is formed of spun-bonded polyester.

* * * * *